(12) United States Patent
van den Berg

(10) Patent No.: US 6,929,252 B2
(45) Date of Patent: Aug. 16, 2005

(54) IMPLEMENT FOR DEMARCATING AN AREA, AS WELL AS A VEHICLE SUITABLE FOR BEING USED IN SAID IMPLEMENT

(75) Inventor: Karel van den Berg, Bleskensgraaf (NL)

(73) Assignee: Lely Research Holding AG, Zug (CH)

(*) Notice: Subject to any disclaimer, the term of this patent is extended or adjusted under 35 U.S.C. 154(b) by 0 days.

(21) Appl. No.: 09/884,829

(22) Filed: Jun. 19, 2001

(65) Prior Publication Data

US 2002/0011595 A1 Jan. 31, 2002

Related U.S. Application Data

(63) Continuation of application No. PCT/NL00/00661, filed on Sep. 19, 2000.

(30) Foreign Application Priority Data

Oct. 20, 1999 (NL) .............................................. 1013349

(51) Int. Cl.$^7$ ................................................. A01K 3/00
(52) U.S. Cl. .............................. 256/10; 256/32; 256/40; 256/1; 119/510; 119/512; 119/518
(58) Field of Search ............................ 256/21, 32, 40, 256/1, 25, 10; 119/488, 502, 510, 514, 518, 512, 174, 720, 721; 242/403

(56) References Cited

U.S. PATENT DOCUMENTS

| | | | | |
|---|---|---|---|---|
| 2,987,299 A | * | 6/1961 | Kneen ...................... 256/32 X |
| 3,302,616 A | * | 2/1967 | Bradshaw ................... 119/488 |
| 3,650,492 A | * | 3/1972 | Stum ......................... 242/390 |
| 3,972,307 A | * | 8/1976 | Marseillan .................. 119/502 |
| 3,987,912 A | * | 10/1976 | Leon Moyano ............. 119/512 |
| 4,048,959 A | * | 9/1977 | Steele ........................ 119/512 |
| 4,341,181 A | | 7/1982 | Fair |
| 4,721,061 A | * | 1/1988 | McNatt ...................... 119/502 |
| 5,568,900 A | * | 10/1996 | Conroy ....................... 242/557 |
| 5,572,954 A | * | 11/1996 | Elkins ........................ 119/502 |
| 5,913,801 A | * | 6/1999 | Bottinger et al. ......... 56/10.2 R |
| 6,067,940 A | * | 5/2000 | Holder ....................... 119/512 |
| 6,338,013 B1 | * | 1/2002 | Ruffner ...................... 701/23 |
| 6,439,162 B1 | * | 8/2002 | van den Berg ............ 119/174 |

FOREIGN PATENT DOCUMENTS

| | | |
|---|---|---|
| DE | 4215714 A1 | 11/1993 |
| FR | 2488103 | 2/1982 |

OTHER PUBLICATIONS

Abstract: DE 42 15 714 Nov. 1993 Schulte.*
Abstract: DE 42 15 714 Nov. 1993 DE Schulte.*

* cited by examiner

Primary Examiner—Daniel P. Stodola
Assistant Examiner—Michael P. Ferguson
(74) Attorney, Agent, or Firm—Penrose Lucas Albright

(57) ABSTRACT

An apparatus for demarcating an area for restricting the freedom of movement of animals that may be in the area for grazing purposes. The demarcation element, as such, may be a cord, band, ribbon, strip, cable, rope or electrified or communication wire which may be two parallel wires separated by a flexible insulating material. The demarcation element is supported by a plurality of vehicles although one or two ends of same may be secured at a reference point. The vehicle is supported by two relatively large wheels which are independently connected to motors and the center of gravity of vehicle is lower than the centers of the wheels which may be perpendicular to the ground or slanted inwardly. The vehicle carries solar panels which may be mounted on the wheels if they are slanted. A connection for the demarcation element is carried on each vehicle which may include a guide member and tightening device. Also measuring devices are included for measuring the length of sections of a demarcation element between vehicles and the angles at which they extend relative to a predetermined direction.

16 Claims, 5 Drawing Sheets

IMPLEMENT FOR DEMARCATING AN AREA, AS WELL AS A VEHICLE SUITABLE FOR BEING USED IN SAID IMPLEMENT

RELATED APPLICATION

This application is a Continuation of International Application No. PCT/NL00/00661, filed Sep. 19, 2000.

FIELD OF THE INVENTION

The invention relates to an apparatus restricting the freedom of a group of animals, as well as to a vehicle which is suitable for being used in said apparatus. Such apparatuses are used, for example, for demarcating pasture areas for cows or sheep. In known apparatuses, however, among other things the flexibility leaves room for improvement.

SUMMARY OF THE INVENTION

The invention aims at providing an improved apparatus of the type involved. According to the invention this is achieved by providing demarcation means such as an electrified wire or cable which can be moved so that with the aid of a vehicle the end of a section of the demarcation means can be placed to a desired location whereby the apparatus is extremely flexible and compact. The other end of the section can be positioned with the aid of a further vehicle or by means of a fixed reference point.

BRIEF DESCRIPTION OF THE PREFERRED EMBODIMENTS

The invention will now be explained in further detail with reference to the accompanying drawing.

DETAILED DESCRIPTION OF THE PREFERRED EMBODIMENTS

Figure 1:
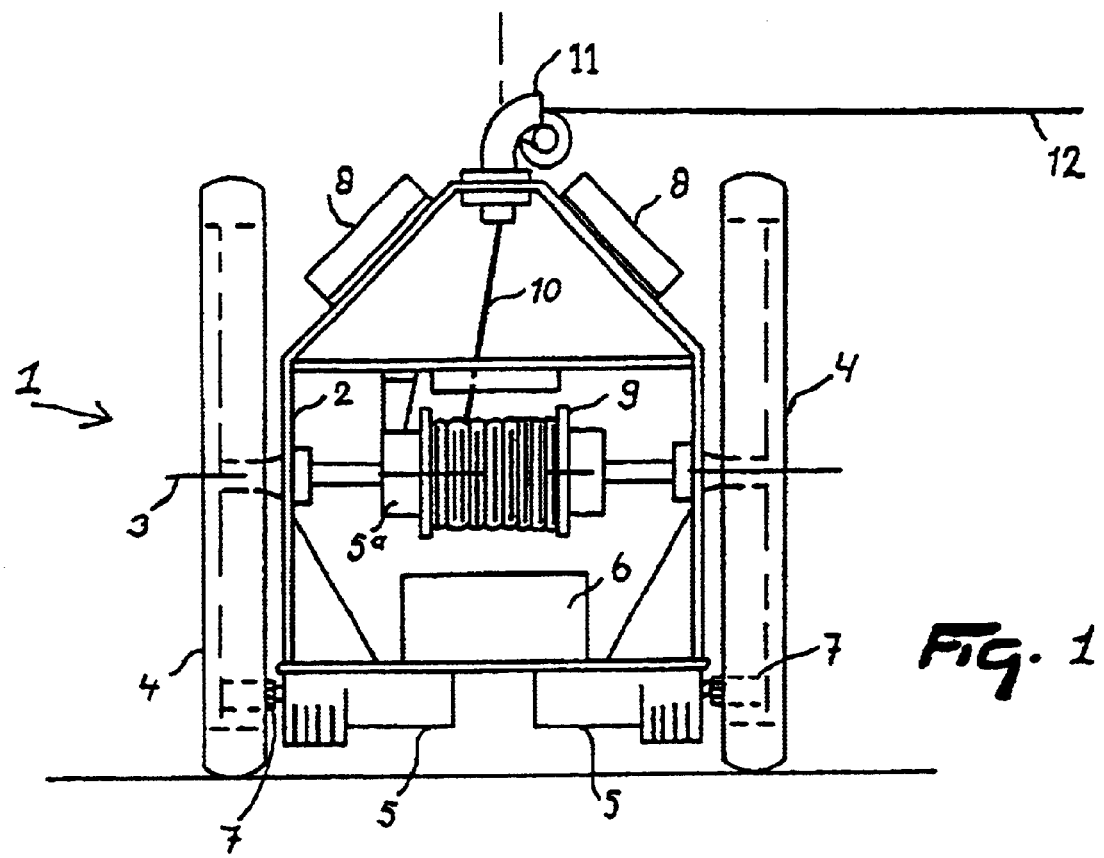
FIG. 1 is a schematic elevational front view of a first embodiment of a vehicle to be used in the apparatus according to the invention.

FIG. 1 is a schematic front elevational view of a first embodiment of a vehicle 1 to be used in the apparatus according to the invention. Vehicle 1 is an unmanned vehicle comprising a chassis 2 with two wheels 4 that are bearing-supported on an axis 3. The center of gravity of chassis 2 is situated below axis 3, so that the chassis 2 maintains substantially the same orientation relative to axis 3 when vehicle 1 is moving. Wheels 4 may be made of synthetic material and have a diameter of, for example, approximately 750 millimeters. Of course, vehicle 1 may be provided with more wheels 4. However, a two-wheeled vehicle has various advantages, as will be explained hereinafter.

Both wheels 4 of vehicle 1 are drivable independently of each other with the aid of motors 5 which are connected to a storage battery 6 and which, via gears 7 that cooperate with an internal toothing in wheels 4, are capable of making each of wheels 4 rotate about axis 3. On chassis 2 there are further provided solar panels 8 for energy supply. Because of independently drivable wheels 4, vehicle 1 has an excellent maneuverability and accurate controllability. Vehicle 1 is also capable of easily surmounting small obstructions without harmful consequences. The vehicle is remotely controlled by means, for example, of a computer which is in communication with all vehicles 1 of the apparatus. The apparatus may be provided with a positioning system, such as, for example, GPS, for each vehicle 1. The computer may be programmed such that vehicles 1 move at predetermined points of time according to a predetermined pattern.

Vehicle 1 is further provided with a drum 9 which is drivable by means of a further motor 5a for winding and unwinding an adjustable section of a demarcation element 10. Said demarcation element 10 may, for example, be constituted by a cord, band, ribbon, strip, (electrified) wire, cable or rope. The further motor 5a of drum 9 is also suitable for tightening demarcation element 10. Drum 9 may further be provided with a spring which also serves to place demarcation element 10 under tension. Demarcation element 10 extends upwardly from drum 9 and then proceeds to a further fastening point via a guide element 11 which is rotatable about a vertical axis. Thus, vehicle 1 is permanently connected to demarcation element 10 and suitable for adjustably positioning an end of an unwound, tightened, substantially straight extending section 12 of demarcation element 10.

When demarcation element 10 is designed as an electrified wire, vehicle 1 is further provided with a sliding electrically conductive contact with the ground. Demarcation element 10 may also be designed as a double conductor (such as in a strip). This has the advantage that a mutual communication between several vehicles 1 or between a vehicle land the controlling computer, or both, is possible via the two conductors. In this situation a sliding contact is superfluous.

Figure 2:
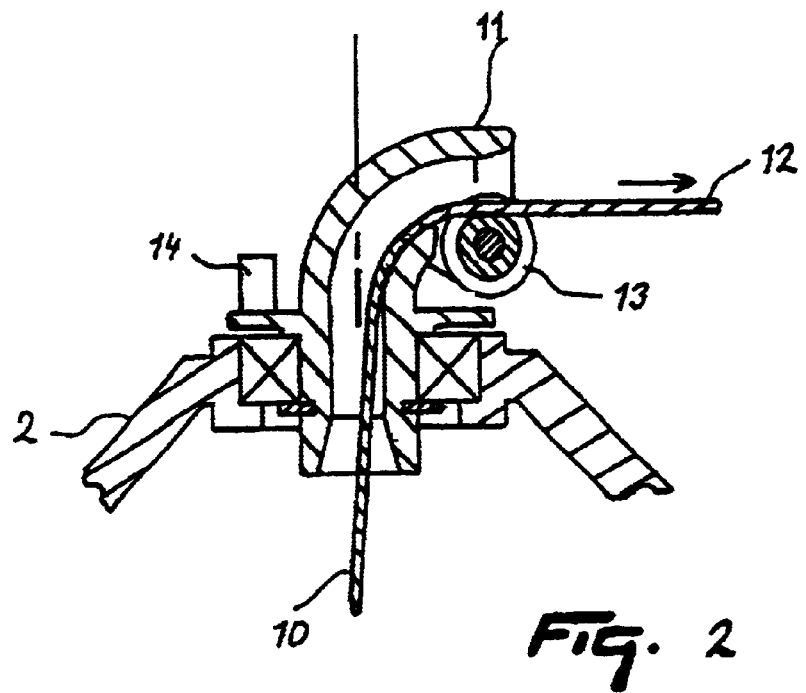
FIG. 2 shows a detail of the vehicle depicted in FIG. 1.

FIG. 2 shows a detail of the vehicle depicted in FIG. 1. The rotatable guide element 11 for demarcation element 10 is provided with length measuring means, the measuring wheel 13, for determining the length of a wound or unwound section of demarcation element 10. Further provided is an angle measuring means, the angle measuring device 14, for determining the angle between a horizontal reference direction of vehicle 1 such as the direction of travel of the vehicle 1, and the direction of the substantially straight extending section 12 of demarcation element 10. By means of angle measuring device 14 and measuring wheel 13 it is possible to determine exactly the length of straight section 12 of the angle through which said straight section 12 extends relative to the reference direction of vehicle 1. Accordingly, also the position of the other end of straight section 12 is known, even without making use of a positioning system such as GPS. It is also possible to use a compass instead of angle measuring device 14.

Figure 3:
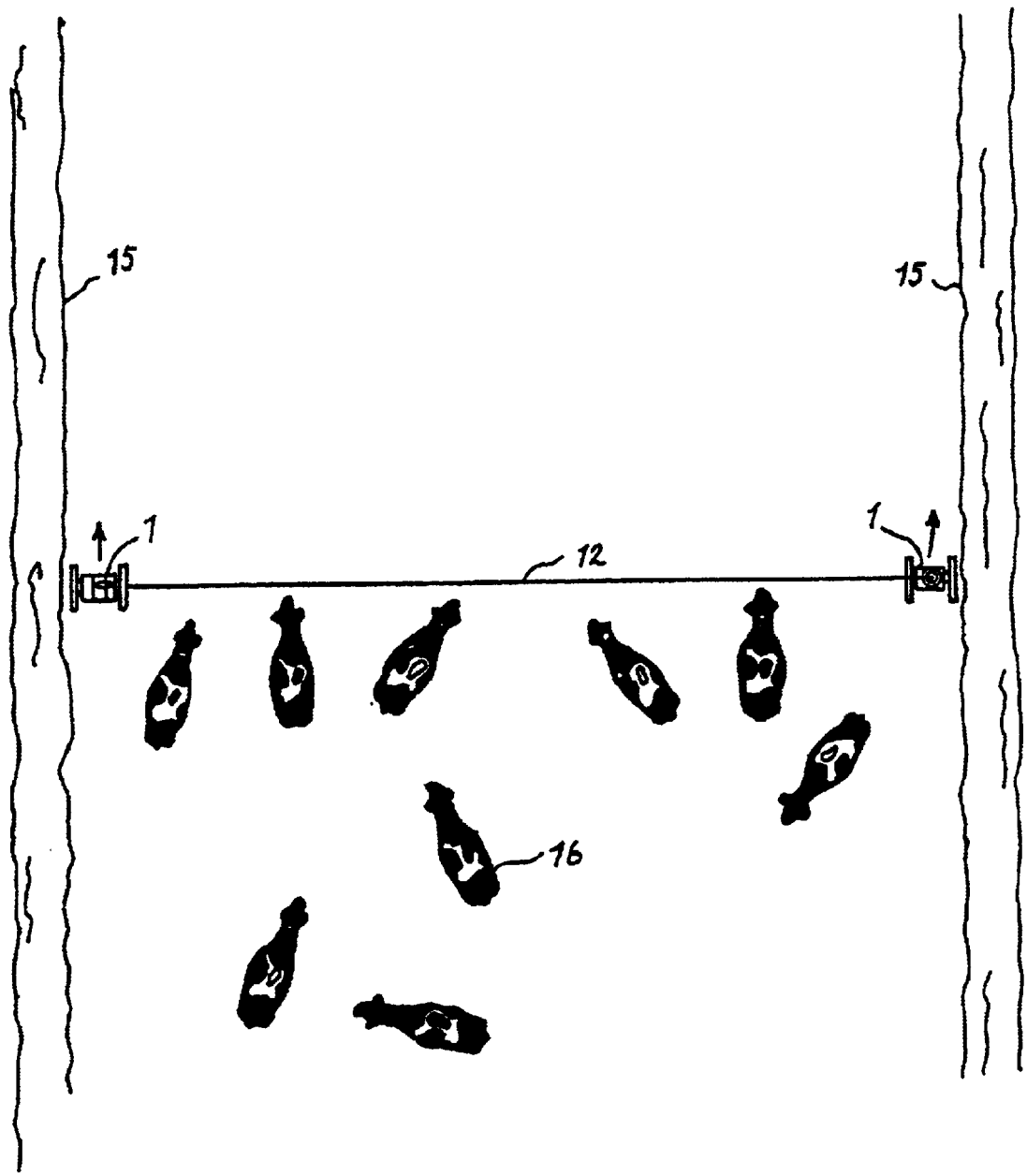
FIG. 3 is a plan view of a first pasture where the apparatus according to the invention is applied.

FIG. 3 is a plan view of a first pasture where the apparatus according to the invention is employed. The pasture is confined by ditches 15. The area between the ditches 15, where the cows 16 are allowed to graze, is delimited by two vehicles 1 which together support a straight section 12 of demarcation element which is not crossed by the cows 16. By moving the unmanned, remotely controlled vehicles 1 in the direction of the arrows adjacent such vehicles, the area where cows 16 are allowed to graze changes. It will also be appreciated that a single vehicle 1 may be used, while the other end of straight section 12 is connected to a fixed point.

Figure 4:
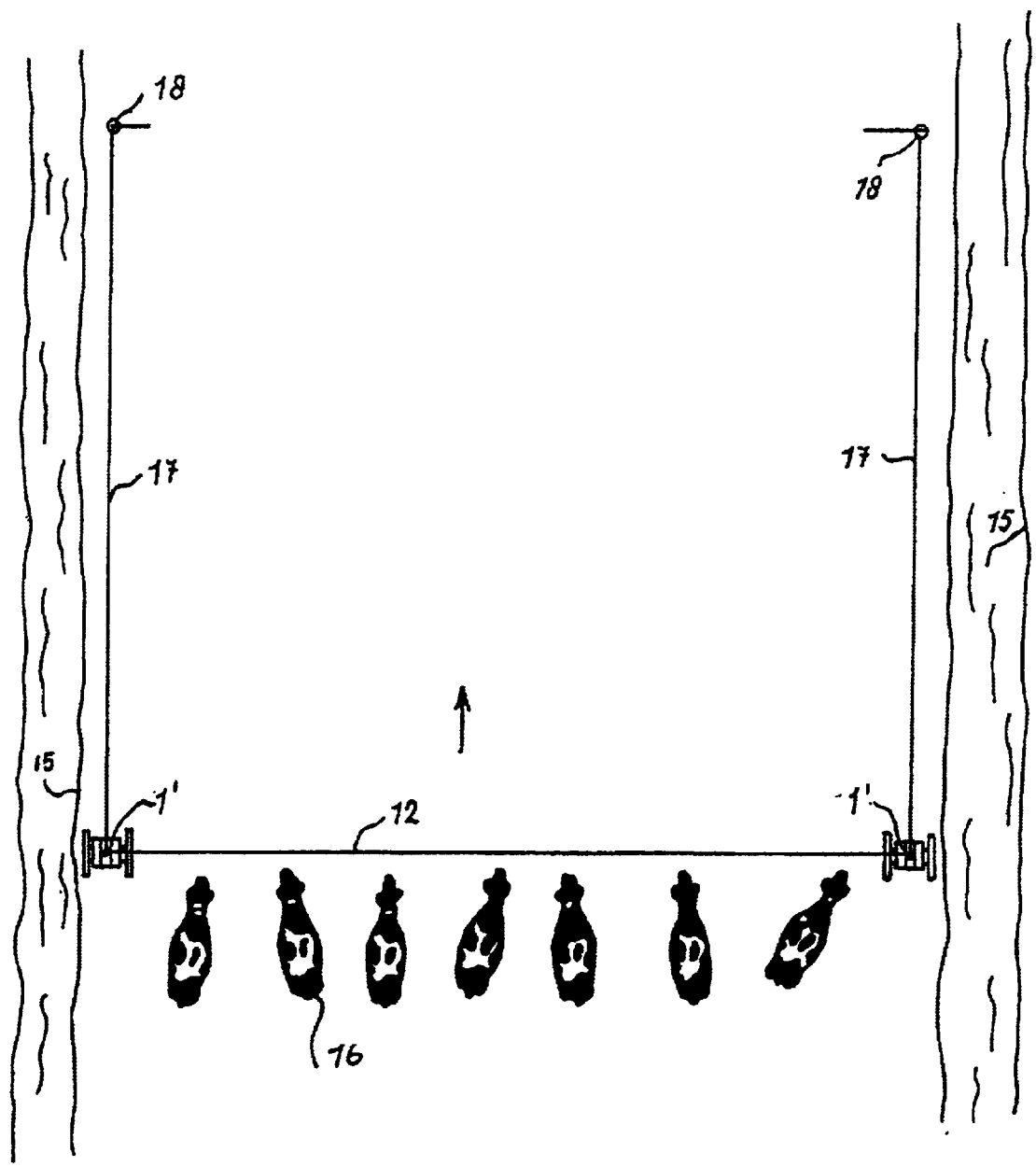
FIG. 4 is a plan view of a further pasture where the apparatus according to the invention is applied.

FIG. 4 is a plan view of a further pasture where the apparatus according to the invention may be employed. In this embodiment vehicles 1 are each connected via a line 17 to a fixed reference point 18. By means of line 17 each vehicle 1 may be pulled by drums 9 in the direction of reference point 18, so that the area where cows 16 are allowed to graze changes continuously. In this situation the vehicles 1 may be designed without the motors 5.

Figure 5:
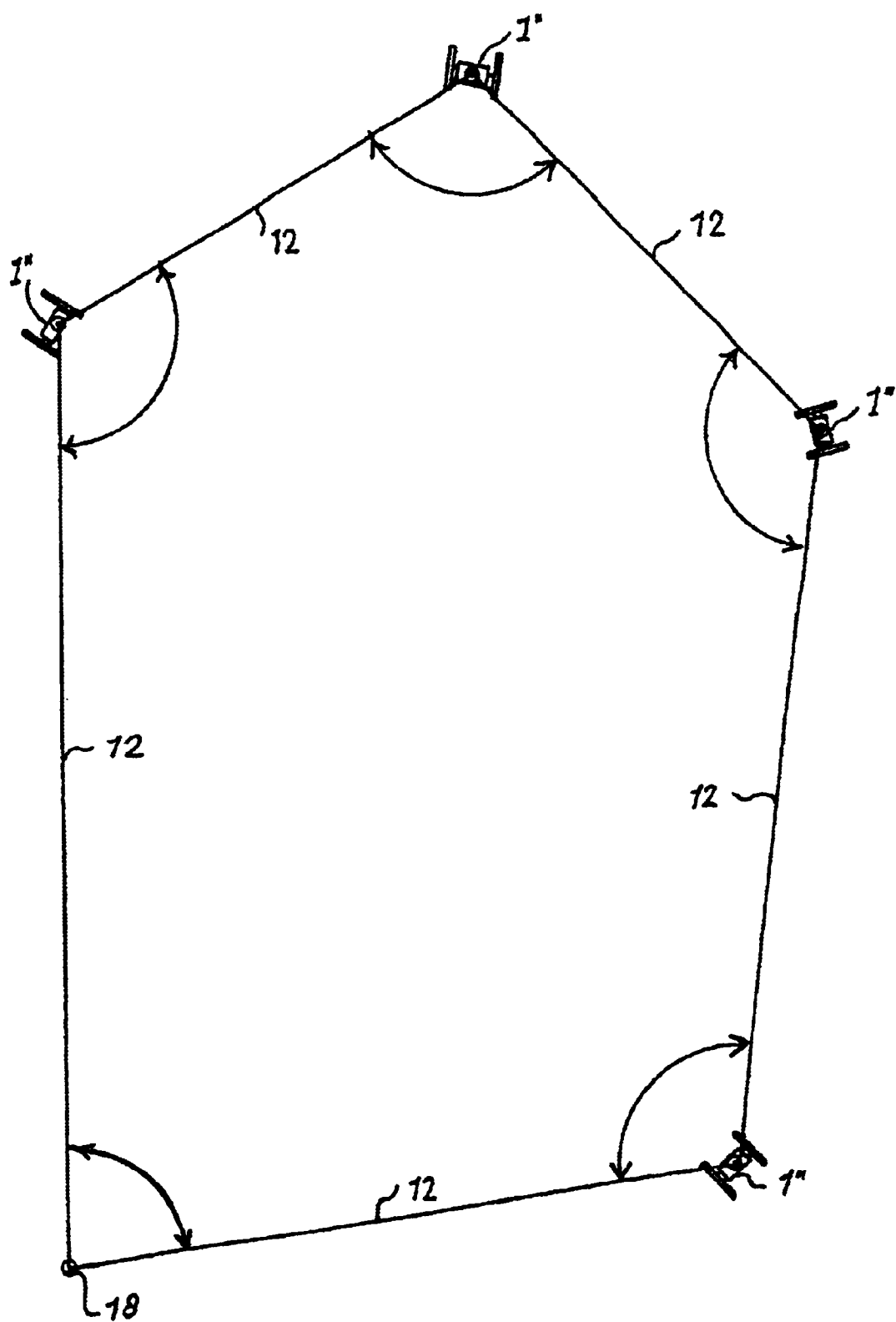
FIG. 5 is a schematic plan view of another pasture where the apparatus according to the invention is applied.

FIG. 5 is a schematic plan view of another pasture where the apparatus according to the invention is applied. In this embodiment the apparatus is provided with a reference point 18 for receiving and for fastening the ends of demarcation element 10. Although this reference point 18 is initially adjustable, it remains fixed after the initial setting. The four vehicles 1 will be described hereinafter in further detail with reference to FIGS. 6 and 7. In this situation a drum means 9 for winding and unwinding demarcation element 10 may be disposed at reference point 18, as well as the tightening means 5a. Reference point 18 is also provided with angle measuring means 14 for determining the angle between a (horizontal) reference direction of reference point 18 and the direction defined by the ends of demarcation element 10. Each vehicle 1 is equipped with means for determining the angle between the two straight sections 12 of the demarcation element converging in the relevant vehicle 1. Movement of vehicles 1 makes it possible to change the area to be demarcated in a simple manner.

Figure 6:
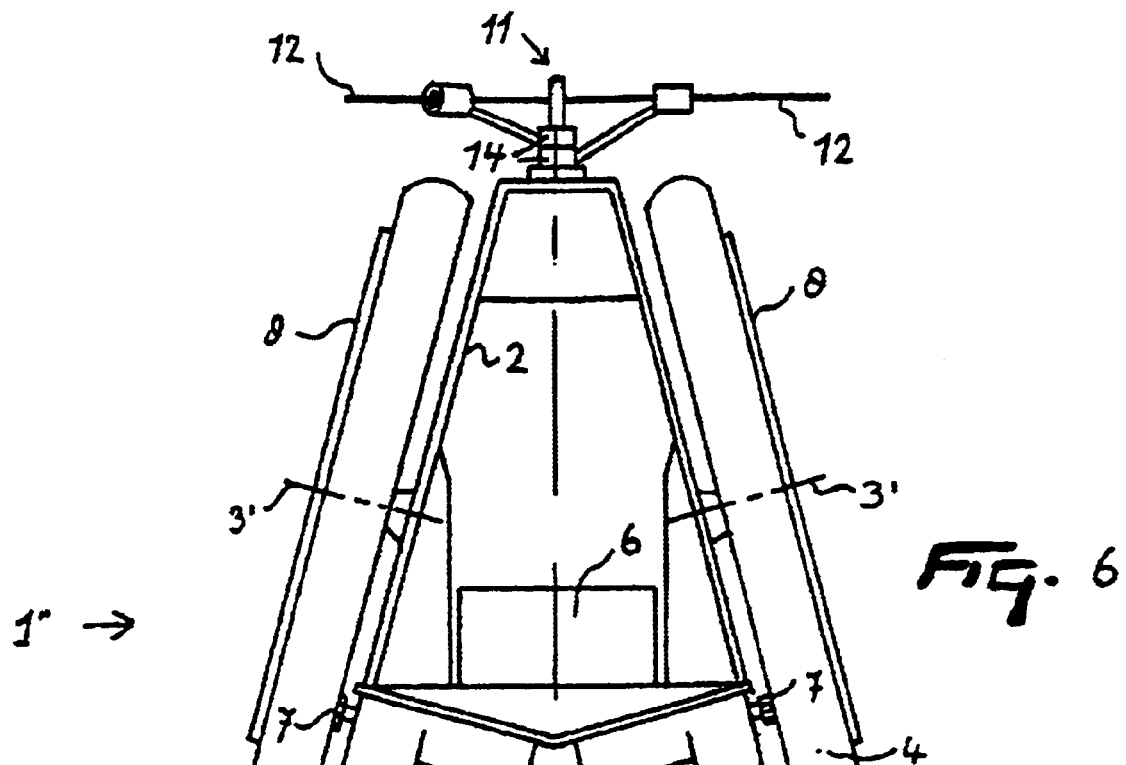
FIG. 6 is a schematic front view of a second embodiment of a vehicle to be used in the apparatus according to the invention.

FIG. 6 is a schematic front view of the embodiment of the vehicle to be used in the implement depicted in FIG. 5. Wheels 4 of vehicle 1 are attached to vehicle 1 that their imaginary axes 3 intersect in a point which is situated at a lower level than the centers of wheels 4, which contributes to the stability of vehicle 1. Moreover, in this situation it is possible to provide solar panels 8 for energy supply at the outside of obliquely placed wheels 4. Vehicle 1 has no drum 9. Straight sections 12 of the demarcation element are guided through guide element 11.

Figure 7:
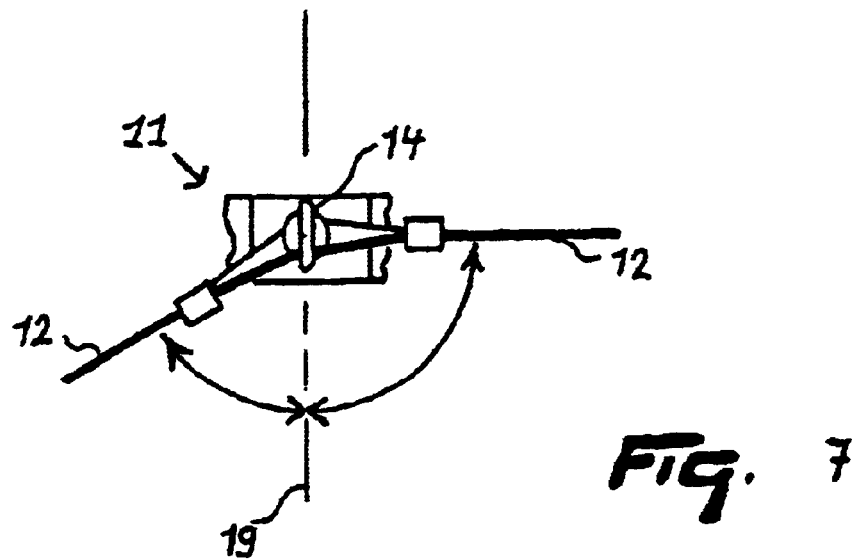
FIG. 7 shows, in plan view, a detail of the vehicle depicted in FIG. 6.

Here angle measuring device 14 is designed so that it is possible to determine the angle between the two straight sections 12 of the demarcation element converging in vehicle 1. This result may be obtained, for example, by measuring by means of two angle measuring devices the angle between a reference direction 19 of vehicle 1 and each relevant straight section 12 of the demarcation element. This is further illustrated in FIG. 7 showing, in plan view, a detail of the vehicle depicted in FIG. 6. Vehicle 1 is permanently connected to demarcation element 10, which is capable of being wound and unwound and being tightened and which is suitable for adjustably positioning an end of two substantially straight extending, unwound, tightened sections 12 of demarcation element 10.

The apparatus may be provided with means for determining the distance from one of the vehicles 1, 1', 1" to an adjustable measuring point, in particular to one of the further vehicles 1, 1', 1". Such means, which are well known in the art, may comprise a positioning system, such as GPS. The means may also be equipped with an ultrasonic sensor or an infrared sensor.

The apparatus may further be provided with means for determining the contours of the area to be demarcated. When the positions of vehicles 1, 1', 1" and reference point 18 are known, it is possible to determine with, for example, the aid of the computer, all sorts of data concerning the area to be demarcated (surface, circumference, etc.).

In a further embodiment, vehicle is provided with two drums 9, which are capable of being controlled independently of each other. This makes the apparatus even more flexible and more readily employable.

What is claimed is:

1. An apparatus for demarcating an area in which the movement of animals is restricted which comprises a demarcation element that includes a plurality of flexible sections, a plurality of unmanned vehicles, each of said vehicles being connected to at least one end of at least one of said sections, at least one of said vehicles including a geodetic positioning system for selectively positioning said vehicles, said geodetic positioning system comprising a computer for remotely controlling said vehicles, and all of said vehicles including tightening means adjustably positioning at least one end of one of said sections and tightening a said section which extends between said vehicles, said vehicles each being supported by two wheels which are independently controllable by motors carried on said vehicles, the apparatus further comprising solar panels which are operatively connected to said motors for providing energy to said motors.

2. A system for demarcating an area within a field to limit the freedom of movement of animals which comprises: a plurality of unmanned vehicles; each of said vehicles having motive means for moving said vehicle and a power source for energizing said motive means, each of said vehicles having two ground engaging members for moving and steering it which are rotated by said motive means; a computer that remotely controls each of said vehicles, at least one of said vehicles having a reel upon which said a wire can be wound and unwound and which tightens said wire; and each of said vehicles having location determining means via a geodetic positioning system which cooperates with said computer for determining the position of each of said vehicles relative to said field, said computer being programmed so that said vehicles are remotely controlled by said computer to move to predetermine locations at predetermined points of time according to a predetermined pattern.

3. A system in accordance with claim 2, wherein said ground engaging members comprise wheels which rotate about a respective axis of rotation, the center of gravity of each of said vehicles being below its respective axis of rotation.

4. A system in accordance with claim 2, wherein said power source comprises for each said vehicle a battery and a solar panel for charging said battery carried by each said vehicle.

5. An apparatus for demarcating an area which comprises a demarcation element that includes at least one section and an unmanned vehicle connected to an end of said section, said vehicle including a geodetic positioning system for selectively positioning said end of said section of said demarcation element, said geodetic positioning system comprising a computer for remotely controlling said vehicle, angle measuring means associated with said demarcation element for determining an angle selected from a plurality of angles, said selected angle being between a predetermined substantially horizontal directions and said section, wherein said section is adjustable in length, the apparatus further comprising winding means fitted to said vehicle for winding and unwinding said adjustable section, and a reference point which is connected to another end of said section, a further winding means being disposed at said reference point.

6. An apparatus in accordance with claim 5, wherein said demarcation element is flexible so that it can be wound and rewound.

7. An apparatus in accordance with claim 6, wherein said demarcation element includes tightening means for tightening said demarcation element.

8. An apparatus in accordance with claim 5, which comprises a section length measuring means for determining the length of said section between said reference point and said vehicle.

9. An apparatus in accordance with claim 5, wherein said vehicle is provided with solar panels for its energy supply.

10. An apparatus in accordance with claim 5, wherein said vehicle is an unmanned vehicle.

11. An apparatus in accordance with claim 5, wherein said vehicle comprises ground engaging rotatable members that support said vehicle, said ground engaging rotatable members consisting of essentially two members.

12. An apparatus in accordance with claim 11, wherein said ground engaging rotatable members are connected to drive means so that they are independently drivable relative to each other.

13. An apparatus in accordance with claim 5, wherein said demarcation element is flexible, tightening means being provided for said demarcation element, said tightening means comprising a motor.

14. An apparatus in accordance with claim 5, which comprises a further vehicle and distance determining means for determining the distance between said first mentioned vehicle and said further vehicle.

15. An apparatus in accordance with claim 5, wherein said demarcation element comprises a double conductor.

16. An apparatus in accordance with claim 5, which comprises a computer for remotely controlling said vehicle.

* * * * *